Patented Oct. 4, 1932

1,880,678

UNITED STATES PATENT OFFICE

ALLING P. BEARDSLEY AND MAURICE L. DOLT, OF PLAINFIELD, NEW JERSEY, ASSIGNORS TO THE CALCO CHEMICAL COMPANY, INC., OF BOUND BROOK, NEW JERSEY, A CORPORATION OF DELAWARE

CATALYTIC CONTACT MASS

No Drawing.  Application filed August 3, 1929. Serial No. 383,417.

This invention relates to a catalytic contact mass particularly adapted for use in the contact method of making sulphuric acid and to a method of making such a mass.

A contact mass embodying the invention contains a silicious material (such as calcined Celite chips, or other massive particles of substantially pure silica), vanadium and an alkali metal in such form that after the mass has been used to convert sulphur dioxide and oxygen into sulphur trioxide at ordinary conversion temperatures, substantially all the vanadium is in water-extractable form and may be separated from all the silicious material by extraction with water or dilute acids without disintegration of the silica particles. The new mass has a greater catalytic activity per unit volume in converting sulphur dioxide and oxygen into sulphur trioxide than previously known contact masses containing vanadium, and this increased activity is particularly marked at low conversion temperatures where a large percentage of conversion is most important in commercial practice.

We cannot state with certainty whether the fact that substantially all the vanadium in the new mass is water-extractable after use of the mass is, chemically, the cause of the increased catalytic activity, but we have ascertained that it is at least an accompaniment thereof, so that it forms a ready and definite test for identifying our new mass and distinguishing it from previously known contact masses containing the same elements, in all of which a substantial proportion of the vanadium present, usually about thirty per cent, is combined or held in the mass in such a way that it cannot be extracted by water or weak acids after the use of the mass.

Another distinguishing characteristic of the new mass lies in the fact that substantially all the vanadium and the alkali metal may be extracted from the mass by water, before the mass has been used with a converter, without extracting any silicon. In previously known masses containing silicious material, an alkali metal and vanadium treatment of the completed mass, before use, with water results in extracting with the metals a part of a silicon of the silicious material.

Our method of making the new mass consists in absorbing by a porous silicious carrier non-alkaline solutions of soluble compounds of vanadium and an alkali metal. The vanadium compound may be either a soluble salt of meta-vanadic acid or a soluble vanadyl salt of a mineral acid, as both these classes of soluble compounds are non-alkaline. The alkali metal compound must be a soluble alkali metal salt which is non-alkaline and remains so when heated. Examples of such compounds are the neutral and acid alkali metal salts of the mineral acids. By using non-alkaline solutions, chemical combination between the vanadium and the alkali metal and the silica of the carrier is avoided, since silica is essentially of an acid nature. If, on the other hand, an alkaline solution of the alkali metal, such as a hydroxide or carbonate solution, be used, a soluble compound containing the alkali metal and silicon of the carrier, presumably a soluble silicate, is formed. Heating of the mass in an atmosphere containing sulphur dioxide and trioxide, such as occurs during the use of the mass in a converter, destroys this soluble silicate, and, at the same time, binds a substantial part of the vanadium to the silicon carrier in such a way that it cannot be separated from the silicious material by extracting with water or weak acids. This binding of a substantial part of the vanadium occurs whenever the alkali metal has been applied to the carrier in an alkaline solution, even though the vanadium has been applied to the carrier at a separate time in a separate neutral solution. It thus appears to be a result of the initial presence of a soluble silicate in the mass. It is, therefore, important in making our new mass that the formation of soluble silicates be avoided by applying the alkali metal to the carrier as a non-alkaline solution.

In order that our invention may be the more clearly understood, we will state by way of example two specific methods of making a catalytic mass in accordance with the invention:

(1) 50 grams of commercial vanadium pentoxide, containing 19.8 grams of vanadium, are suspended in 500 cc. of water containing 25.7 grams of KOH. After boiling to dissolve the vanadic oxide as potassium meta-vanadate, the solution is filtered from insoluble matter. The theoretical amount of hydrochloric acid to form KCl and precipitate $V_2O_5$ is then added, and $SO_2$ gas passed into the suspension till the precipitate has all dissolved in the form of a vanadyl salt. 52.6 grams of potassium chloride are then added giving a total of 3 atoms of potassium to one of vanadium. The solution is made up to 1 liter and used to saturate 333 grams of Celite chips, previously calcined at about 1000° C. The solution is applied in three successive lots, with drying at 110° between applications, and after the final application. The mass is then ready for charging into a converter and is active without a period of seasoning in sulphur dioxide gas.

(2) 50 grams of commercial vanadium pentoxide, containing 19.8 grams of vanadium, are suspended in 500 cc. of water containing 25.7 grams of KOH. After boiling to dissolve the vanadic oxide as potassium meta-vanadate, the solution is filtered from insoluble matter Sulphuric acid is then added in quantity calculated to neutralize the excess of potassium hydroxide used in the extraction of the commercial oxide, leaving a solution of potassium sulphate and potassium meta-vanadate. 61.6 grams of potassium sulphate are then added giving a total of three atoms of potassium to one of vanadium. The solution is made up to 1 liter and used to saturate 333 grams of Celite chips, previously calcined at about 1000° C. The solution is applied in three successive lots, with drying at 110° C. between applications and after the final application. The mass requires a treatment in gas containing sulphur dioxide at temperatures in the neighborhood of 400°–500° C. before reaching its maximum activity. This treatment can be given before charging into the converter, or in the converter itself.

While either of the preceding methods will give a mass of high efficiency, we prefer to apply the vanadium as vanadyl sulphate rather than as meta-vanadate.

The catalytic mass made by either method which has been described contains vanadium and potassium in the proportion of one atom of vanadium to three atoms of potassium, and substantially all the vanadium and substantially all the potassium are free from any chemical combination with the silicon contained in the silicious carrier to which the metals have been applied. All the vanadium and potassium may be recovered from the mass, after use of the mass in the contact process of making sulphuric acid, by extraction with water or weak acids without disintegration of the particles of silicious material.

Furthermore, treatment of the mass with water before it has been exposed to $SO_2$ or $SO_3$ results in the extraction of no silicon or compound of silicon.

Accurate comparison of the activity of the new mass made as above described with that of a mass containing the same carrier and the same metals in the same proportion, but having the potassium applied to the carrier in the form of potassium hydroxide instead of in the form of a neutral salt which remains neutral on heating, indicate that the new mass causes an increased percentage of conversion of sulphur dioxide and oxygen into sulphur trioxide, which is particularly marked at temperatures of from 375° C. to 450° C. and by no means negligible at higher temperatures. We have also demonstrated that treatment of the new mass with water or dilute acid after the mass has been used in conversion results in the extraction of ninety-nine per cent of the vanadium, while the similar treatment of the mass in which the potassium was applied in the form of hydroxide yields less than seventy per cent of its vanadium on such extraction.

Apart from its increased catalytic activity, the new mass has another advantage. The extractability of substantially all the vanadium and other metal which it contains, after the mass has been used, permits the recovery of these expensive ingredients from a mass which has been fouled with dust contained in the gases to be converted, without disintegration of the carrier. After removal of the contaminant from the solution containing vanadium and alkali metals, or from a residual silicious carrier, or from both, the solution may be reabsorbed into the carrier by repeated applications as described in the examples already given. The mass may thus be regenerated at a minimum of expense.

The method of making the catalytic mass which has been described is not dependent upon applying the vanadium and the alkali metal to the carrier in the same solution, but may be carried out by applying them separately in separate non-alkaline solutions. The use of the word "solutions" in the claims that follow should, therefore, be understood to include the use of one or more solutions.

What is claimed is:

1. A catalytic mass, comprising massive particles of substantially pure silica, a vanadium compound and an alkali metal compound in such form that, after use of the mass in converting sulphur dioxide and oxygen into sulphur trioxide at elevated temperatures, substantially all the vanadium is water-extractable without disruption of the silica particles.

2. A catalytic mass, comprising massive particles of substantially pure silica, a vanadium compound and an alkali metal compound in such form that, after use of the mass in converting sulphur dioxide and oxygen into sulphur trioxide at elevated temperatures, substantially all the vanadium and substantially all the alkali metal are water-extractable without disruption of the silica particles.

3. A catalytic mass, comprising massive particles of substantially pure silica, a vanadium compound and an alkali metal compound in such form that substantially all the vanadium can be separated from all the silicon of the silicious material by extraction with water without disruption of the silica particles.

4. A catalytic mass, comprising massive particles of substantially pure silica, a vanadium compound and an alkali metal compound in such form that substantially all the vanadium and substantially all the alkali metal can be separated from all the silicon of the silicious material by extraction with water.

5. A catalytic mass, comprising massive particles of silica, a vanadium compound and an alkali metal compound, in which substantially all the vanadium is free from chemical combination with the silicon of the silica.

6. A catalytic mass, comprising massive particles of silica, a vanadium compound and an alkali metal compound, in which substantially all the vanadium and substantially all the alkali metal are free from chemical combination with the silicon of the silica.

7. A catalytic mass, comprising silicious material, a vanadium compound and an alkali metal compound, and substantially free from vanadium-silicon compounds and from soluble silicates.

8. A catalytic mass, comprising massive particles of substantially pure silica, a vanadium compound and an alkali metal compound, substantially free from soluble silicates and having substantially all its vanadium extractable by water without disruption of the silica particles.

9. A catalytic mass, comprising massive particles of substantially pure silica, a vanadium compound and an alkali metal compound, substantially free from soluble silicates and having substantially all its vanadium and substantially all its alkali metal extractable by water without disruption of the silica particles.

10. A catalytic mass, comprising silicious material and a vanadium compound and an alkali metal compound in the proportion of not less than two atoms of the alkali metal to one atom of vanadium, said mass being substantially free from soluble silicates and having all its vanadium in water-extractable form.

11. A catalytic mass, comprising silicious material and a vanadium compound and a alkali metal compound in the proportion of one atom of vanadium to three atoms of the alkali metal.

12. A catalytic mass, comprising silicious material and a vanadium compound and a potassium compound in the proportion of not less than two atoms of potassium to one atom of vanadium, said mass being substantially free from soluble silicates and having all its vanadium in water-extractable form.

13. A catalytic mass, comprising silicious material and a vanadium compound and a potassium compound in the proportion of one atom of vanadium to three atoms of potassium.

14. A catalytic mass, comprising non-friable massive particles of diatomaceous earth impregnated with soluble vanadium and alkali metal compounds and substantially free from soluble silicates.

15. A catalytic mass, comprising massive particles of substantially pure silica impregnated with non-alkaline solutions containing a vanadium compound and an alkali metal compound.

16. A catalytic mass, comprising massive particles of substantially pure silica impregnated with non-alkaline solutions containing a vanadium compound and an alkali metal compound which remain non-alkaline on heating.

17. A catalytic mass, comprising massive particles of substantially pure silica impregnated with a non-alkaline soluble vanadium compound and a non-alkaline compound of an alkali metal which remains non-alkaline on heating.

18. A catalytic mass, comprising massive particles of substantially pure silica impregnated with a non-alkaline soluble vanadium compound and a non-alkaline alkali metal salt of a mineral acid.

19. A catalytic mass, comprising massive particles of substantially pure silica impregnated with a soluble vanadyl salt of a mineral acid and a soluble potassium salt of a mineral acid.

20. A catalytic mass, comprising massive particles of substantially pure silica impregnated with vanadyl sulphate and potassium chloride.

21. A method of making a catalytic mass, which comprises absorbing in porous massive particles of silica non-alkaline solutions containing a vanadium compound and an alkali metal compound.

22. A method of making a catalytic mass, which comprises extracting vanadium from commercial vanadium oxide by an excess of alkali metal caustic, adding sufficient acid to the resulting solution to neutralize the excess caustic and produce a non-alkaline solution, and applying the non-alkaline solution to a carrier of porous massive particles of silica.

23. A method of making a catalytic mass, which comprises passing sulphur dioxide gas into a suspension of vanadium oxide in a solution of an alkali metal salt until the vanadium oxide is dissolved, and applying the resulting solution to a carrier of porous massive particles of silica.

24. A method of making a catalytic mass, which comprises passing sulphur dioxide gas into a suspension of vanadium oxide in a solution of an alkali metal salt until the vanadium oxide is dissolved, adding potassium chloride to the solution, and applying the resulting solution to a carrier of porous massive particles of silica.

25. A catalytic mass comprising massive particles of substantially pure silica, impregnated with a vanadium compound in a form which is water-extractable without disruption of the particles, and with an alkali metal compound in a form which is water-extractable and free from soluble silicates.

In testimony whereof we have hereunto set our hands.

ALLING P. BEARDSLEY.
MAURICE L. DOLT.

CERTIFICATE OF CORRECTION.

Patent No. 1,880,678.                                October 4, 1932.

ALLING P. BEARDSLEY ET AL.

It is hereby certified that error appears in the printed specification of the above numbered patent requiring correction as follows: Page 3, line 28, claim 4, after the word "water" insert the words "without disruption of the silica particles; and that the said Letters Patent should be read with this correction therein that the same may conform to the record of the case in the Patent Office.

Signed and sealed this 10th day of January, A. D. 1933.

(Seal)

M. J. Moore,
Acting Commissioner of Patents.

caustic and produce a non-alkaline solution, and applying the non-alkaline solution to a carrier of porous massive particles of silica.

23. A method of making a catalytic mass, which comprises passing sulphur dioxide gas into a suspension of vanadium oxide in a solution of an alkali metal salt until the vanadium oxide is dissolved, and applying the resulting solution to a carrier of porous massive particles of silica.

24. A method of making a catalytic mass, which comprises passing sulphur dioxide gas into a suspension of vanadium oxide in a solution of an alkali metal salt until the vanadium oxide is dissolved, adding potassium chloride to the solution, and applying the resulting solution to a carrier of porous massive particles of silica.

25. A catalytic mass comprising massive particles of substantially pure silica, impregnated with a vanadium compound in a form which is water-extractable without disruption of the particles, and with an alkali metal compound in a form which is water-extractable and free from soluble silicates.

In testimony whereof we have hereunto set our hands.

ALLING P. BEARDSLEY.
MAURICE L. DOLT.

CERTIFICATE OF CORRECTION.

Patent No. 1,880,678.  October 4, 1932.

ALLING P. BEARDSLEY ET AL.

It is hereby certified that error appears in the printed specification of the above numbered patent requiring correction as follows: Page 3, line 28, claim 4, after the word "water" insert the words "without disruption of the silica particles; and that the said Letters Patent should be read with this correction therein that the same may conform to the record of the case in the Patent Office.

Signed and sealed this 10th day of January, A. D. 1933.

(Seal)

M. J. Moore,
Acting Commissioner of Patents.

CERTIFICATE OF CORRECTION.

Patent No. 1,880,678. October 4, 1932.

ALLING P. BEARDSLEY ET AL.

It is hereby certified that error appears in the printed specification of the above numbered patent requiring correction as follows: Page 3, line 28, claim 4, after the word "water" insert the words "without disruption of the silica particles; and that the said Letters Patent should be read with this correction therein that the same may conform to the record of the case in the Patent Office.

Signed and sealed this 10th day of January, A. D. 1933.

(Seal)

M. J. Moore,
Acting Commissioner of Patents.